(12) United States Patent
Shimomura

(10) Patent No.: US 8,821,623 B2
(45) Date of Patent: Sep. 2, 2014

(54) NON-AQUEOUS INKJET INK

(71) Applicant: Riso Kagaku Corporation, Tokyo (JP)

(72) Inventor: Kenji Shimomura, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 13/665,329

(22) Filed: Oct. 31, 2012

(65) Prior Publication Data

US 2013/0113866 A1 May 9, 2013

(30) Foreign Application Priority Data

Nov. 4, 2011 (JP) ................................ 2011-241805

(51) Int. Cl.
*C09D 11/02* (2014.01)

(52) U.S. Cl.
USPC .................. 106/31.28; 106/31.58; 106/31.86; 106/31.35; 106/31.67

(58) Field of Classification Search
CPC ...... C09D 11/36; C09D 11/32; C09D 11/322; C09D 11/328
USPC ........... 106/31.28, 31.58, 31.86, 31.35, 31.67
See application file for complete search history.

(56) References Cited

U.S. PATENT DOCUMENTS

| | | | | |
|---|---|---|---|---|
| 5,112,398 A | * | 5/1992 | Kruse | 106/31.27 |
| 6,540,334 B1 | * | 4/2003 | Mrvos et al. | 347/64 |
| 7,799,123 B2 | | 9/2010 | Endo et al. | |
| 2003/0177948 A1 | * | 9/2003 | Ohkawa et al. | 106/31.86 |
| 2003/0192453 A1 | * | 10/2003 | Ohkawa et al. | 106/31.57 |
| 2007/0022904 A1 | * | 2/2007 | Kitawaki et al. | 106/31.86 |

FOREIGN PATENT DOCUMENTS

| | | |
|---|---|---|
| JP | 63-113089 A | 5/1988 |
| JP | 07-109430 A | 4/1995 |

* cited by examiner

*Primary Examiner* — Veronica F Faison
(74) *Attorney, Agent, or Firm* — Studebaker & Brackett PC

(57) ABSTRACT

A non-aqueous inkjet ink including at least a pigment, a dye and organic solvents, wherein the total amount of the pigment and the dye is at least 3 mass % relative to the total amount of the ink, the content ratio of the pigment to the dye is in the range from 7:3 to 4:6, the pigment has a DBP oil absorption in the range from 60 $cm^3$/100 g to 140 $cm^3$/100 g, and the organic solvents include at least two organic solvents including an organic solvent with an α value of at most 10 and an organic solvent with an α value of at least 30.

3 Claims, 2 Drawing Sheets

NON-AQUEOUS INKJET INK

BACKGROUND OF THE INVENTION

1. Field of the Invention

The present invention relates to a non-aqueous ink that is suitable for use with an inkjet recording system, and more particularly to a non-aqueous inkjet ink that is suitable for low-resolution printing.

2. Description of the Related Art

Inkjet recording systems eject a highly fluid inkjet ink from very thin head nozzles as ink particles to record an image on a sheet of printing paper, or the like, which is positioned to face the nozzles. Because of low noise and ability of high-speed printing, the inkjet recording systems are rapidly becoming widely used in recent years. Inkjet inks used with inkjet printing systems are generally classified into aqueous inks and non-aqueous inks. The non-aqueous inks are characterized by having good on-machine stability, such as good intermittent ejection property and ejection recovery after being left for a long time, not causing curl of printing paper, and penetrating and drying in a short time, and thus are widely used. For example, the applicant of the present application has proposed, in U.S. Pat. No. 7,799,123 (hereinafter, Patent Document 1), a non-aqueous ink including a pigment and an organic solvent, such as an ester solvent, a higher alcohol solvent, a hydrocarbon solvent, etc., and further including a soluble polymeric dispersant.

On the other hand, with respect to printing systems, there are demands for low-resolution systems in view of increasing printing speed and reducing hardware cost. Pigment inks, such as one disclosed in Patent Document 1, are characterized by that they do not easily spread, since the colorant thereof has a large particle size and is caught up in the fibers of the printing paper while the ink penetrates into the printing paper and is fixed, and that they provide a highly durable and water resistant image. However, the advantage of the pigment inks that they do not easily spread becomes a problem when the pigment inks are used for low-resolution printing, where a distance between pixels is large and the pigment inks fail to fill gaps between the pixels, resulting in a low image density.

When dye inks using a dye, such as one disclosed in Japanese Unexamined Patent Publication No. S63 (1988)-113089 (hereinafter, Patent Document 2), are used, the dye moves along with penetration of the solvent and the resulting image is blurred. Therefore, when the dye inks are used for low-resolution printing, they fill gaps between the pixels. However, the dye itself moves deep into the printing paper along with the penetration of the ink, resulting in a very low surface density and a high degree of strike-through. On the other hand, a pigment-dye combined ink using a pigment and a dye in combination (which may hereinafter be referred to as "combined ink") is disclosed, for example, in Japanese Unexamined Patent Publication No. H07 (1995)-109430 (hereinafter, Patent Document 3).

It may be considered that, when a pigment and a dye are used in combination for low-resolution printing, the dye moves to fill gaps between the pixels to thereby provide a high image density. However, when the combined ink having the composition as disclosed in Patent Document 3 is used for low-resolution printing, the pigment stays at the center of each dot and a blurred color is formed by the spread dye around the center, resulting in an image having very poor image quality. Therefore, it is difficult to provide an image having an appropriate dot gain and a desired image density by low-resolution printing using the conventional combined inks.

SUMMARY OF THE INVENTION

In view of the above-described circumstances, the present invention is directed to providing a non-aqueous inkjet ink which provides an improved print density even when it is used in low resolution printing where a distance between pixels is large.

An aspect of the non-aqueous inkjet ink of the invention is a non-aqueous inkjet ink including at least a pigment, a dye and organic solvents, wherein a total amount of the pigment and the dye is at least 3 mass % relative to a total amount of the ink, a content ratio of the pigment to the dye is in the range from 7:3 to 4:6, the pigment has a DBP oil absorption in the range from 60 $cm^3/100$ g to 140 $cm^3/100$ g, and the organic solvents include at least two organic solvents including an organic solvent with an α value of at most 10 and an organic solvent with an α value of at least 30.

An aspect of the inkjet printing method of the invention includes forming an image at a print resolution of 300×300 dpi or less using the above-described non-aqueous inkjet ink.

The non-aqueous inkjet ink of the invention is a non-aqueous inkjet ink including at least a pigment, a dye and organic solvents, wherein the total amount of the pigment and the dye is at least 3 mass % relative to the total amount of the ink, the content ratio of the pigment to the dye is in the range from 7:3 to 4:6, the pigment has a DBP oil absorption in the range from 60 $cm^3/100$ g to 140 $cm^3/100$ g, and the organic solvents include at least two organic solvents including an organic solvent with an α value of at most 10 and an organic solvent with an α value of at least 30. Therefore, the non-aqueous inkjet ink of the invention achieves an appropriate dot gain even in low-resolution printing at 300×300 dpi or less with the same level of ejection amount as that of the conventional inks.

DESCRIPTION OF THE PREFERRED EMBODIMENTS

A non-aqueous inkjet ink of the present invention is a non-aqueous inkjet ink (which may hereinafter be referred to simply as "ink") including at least a pigment, a dye and organic solvents, wherein the total amount of the pigment and the dye is at least 3 mass % relative to the total amount of the ink, the content ratio of the pigment to the dye is in the range from 7:3 to 4:6, the pigment has a DBP oil absorption in the range from 60 $cm^3/100$ g to 140 $cm^3/100$ g, and the organic solvents include at least two organic solvents including an organic solvent with an α value of at most 10 and an organic solvent with an α value of at least 30. The organic solvent with an α value of at most 10 may preferably has an α value less than 10.

The colorant of the ink includes both a pigment and a dye, where the total amount of the pigment and the dye is at least 3 mass % relative to the total amount of the ink, and the content ratio of the pigment to the dye is in the range from 7:3 to 4:6. In order to obtain a desired image density, the amount of each of the pigment and the dye has to be at least 3 mass % relative to the total amount of the ink. However, an excessively large amount of the colorant contained in the ink results in a high ink viscosity, which deteriorates the ejection property. The content ratio of the pigment to the dye in the range from 7:3 to 4:6 allows achieving a desired image density while adjusting ink viscosity. The total amount of the pigment and the dye may preferably be 20 mass % or less relative to the total amount of the ink. If the total amount of the pigment and the dye is more than 20 mass %, it will be difficult to achieve good ejection property even when the content ratio of the pigment to the dye is within the above-described range.

Figure 1:
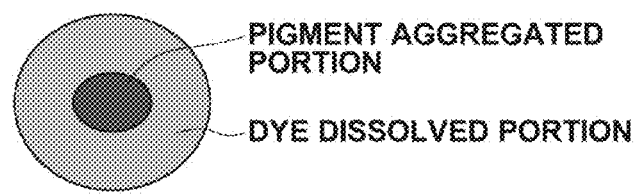
FIG. 1 is an enlarged schematic diagram showing a state where an ink has landed on printing paper.
Figure 2:
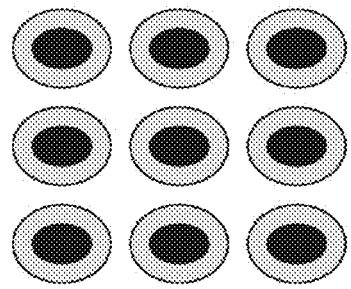
FIG. 2 is an enlarged schematic diagram illustrating one embodiment of a dot gain in low-resolution printing.
Figure 3:
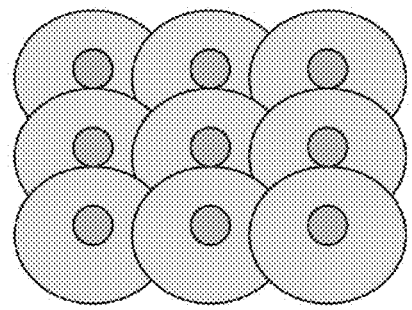
FIG. 3 is an enlarged schematic diagram illustrating another embodiment of the dot gain in low-resolution printing.
Figure 4:
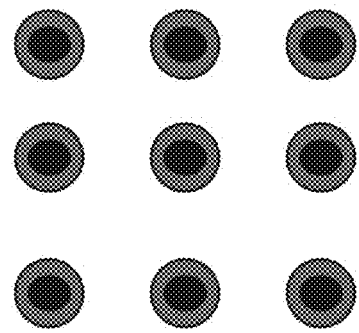
FIG. 4 is an enlarged schematic diagram illustrating yet another embodiment of the dot gain in low-resolution printing.

With the content ratio of the pigment to the dye within the above-described range, an optimal dot gain is achieved, which allows providing a good image density and minimizing the strike-through at the same time. Now, the invention is described with reference to the drawings. FIG. 1 is an enlarged schematic diagram showing a state where an ink which contains a pigment and a dye as the colorant has landed on printing paper. FIGS. 2 to 4 are enlarged schematic diagrams showing states of dot gain in low-resolution printing.

As shown in FIG. 1, the ink landed on the printing paper forms a center area where the pigment is caught up in fibers of the printing paper (a pigment aggregated portion shown in FIG. 1), and a surrounding area where the dye dissolved in the organic solvent spreads (a dye dissolved portion shown in FIG. 1). In a case where the amount of the pigment contained in the ink is large, the pigment aggregated portion has a high density. In this case, while each dot has a high density, the dot gain is small since the amount of the dissolved dye is small and the pigment absorbs the solvent. Therefore, when low-resolution printing is performed, gaps between the dots are not filled with a solid color, as shown in FIG. 2, resulting in a low image density. In contrast, in a case where the amount of the dye contained in the ink is large, a large dot gain is provided, as shown in FIG. 3, and the gaps between the pixels are filled with a solid color.

However, the formulation of the ink shown in FIG. 3 contains a large amount of dye and a small amount of pigment, and therefore the density per dot is low. Therefore, although the gaps between the pixels are filled with a solid color, the resulting image has a low density and a high degree of strike-through. In this case, simply increasing the amount of the pigment will result in the state as shown in FIG. 2. According to the invention, the pigment has a DBP oil absorption in the range from 60 cm$^3$/100 g to 140 cm$^3$/100 g. This allows filling the gaps between the pixels with a solid color and obtaining an image with a high density at the same time.

Figure 5:
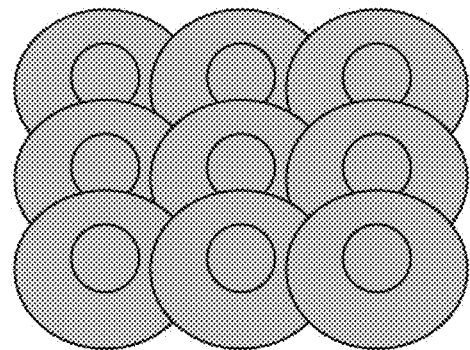
FIG. 5 is an enlarged schematic diagram illustrating a dot gain in low-resolution printing using an ink of the invention.

The DBP oil absorption of the pigment can be measured based on an amount of DBP (dibutylphthalate) absorbed by 100 g of pigment (JIS K6221). A larger DBP oil absorption of the pigment means that a larger amount of solvent is absorbed by the pigment. When a pigment having a large DBP oil absorption is used, the solvent is absorbed by the pigment, resulting in a small dot gain as shown in FIG. 4, and a resulting image has a low density with the gaps between the pixels not filled with a solid color. In contrast, a pigment having a small DBP oil absorption produce a strong color; however, it releases the solvent and thus provides a large dot gain. With the content ratio of the pigment to the dye within the above-described range and the DBP oil absorption within the above-described predetermined range, a large dot gain is provided while achieving a desired density per dot, as shown in FIG. 5. As a result, the gaps between the pixels are filled with a solid color, and thus both an appropriate dot gain and an appropriate density can be achieved. The DBP oil absorption of the pigment may preferably in the range from 100 cm$^3$/100 g to 120 cm$^3$/100 g.

The organic solvents contained in the ink include at least two organic solvents including an organic solvent with an α value of at most 10 and an organic solvent with an α value of at least 30. If three or more organic solvents are contained, organic solvents other than the organic solvent with an α value of at most 10 and the organic solvent with an α value of at least 30 may have any α value. The α value herein refers to α value of a found from tan α=(inorganic value/organic value). The "organic value" and the "inorganic value" are properties based on a concept used in an "organic conceptual diagram" proposed by Atsushi Fujita, in which an organic compound is described in terms of two factors, namely an "organicity" derived from the covalently bonded chain within the carbon region of the compound, and an "inorganicity" derived from the effect of the electrostatic properties that exist within the substituents (functional groups), and each factor is quantified to provide the "organic value" and the "inorganic value". In other words, the "inorganic value" and the "organic value" are values determined from the structure of the individual compound, and the α value indicates a quantitative balance between the "organicity" and the "inorganicity" of the compound. Details regarding the "organic conceptual diagram" are described in "Systematic Organic Qualitative Analysis (Mixtures)", Atsushi Fujita et al., Kazama Shobo Co., Ltd. (1974).

When the organic solvents contained in the ink include an organic solvent with an α value of at most 10 and an organic solvent with an α value of at least 30, the organic solvent with an α value of at least 30, in which the dye is dissolved, and the organic solvent with an α value of at most 10, in which no dye is dissolved, are separated from each other during the process of penetration of the landed ink into the printing paper, and the organic solvent with an α value of at most 10, in which no dye is dissolved, penetrates into the printing paper before the organic solvent with an α value of at least 30 to limit the spread of the organic solvent with an α value of at least 30, in which the dye is dissolved. As a result, the spread (blurring) of the dye can be limited to an extent where the effect of the invention is not hindered, and an image having a higher density can be obtained.

Preferred examples of the organic solvent with an α value of at most 10 may include: AF-4 (α value=0.0 (hereinafter, the numerical value in the parenthesis represents the α value )), AF-5 (0), AF-6 (0) and AF-7 (0) available from Nippon Oil; isooctyl palmitate (7.0), dibutyl ether (7.1), hexyl laurate (10), methyl palmitate (10.0), methyl oleate (9.26), butyl oleate (8.0), etc. Preferred examples of the organic solvent with an α value of at least 30 may include dioxane (32.0), diethylene glycol monohexyl ether (44.3), triethylene glycol monobutyl ether (47.1), tetrahydrofurfuryl alcohol (50.2), triethylene glycol monoethyl ether (53.3), etc. Each of the organic solvent with an α value of at most 10 and the organic solvent with an α value of at least 30 may include two or more solvents mixed as appropriate. The content of these solvents may preferably be in the range from 40 mass % to 80 mass % or more preferably in the range from 60 mass % to 80 mass % relative to the total amount of the ink.

The ink of the invention may contain organic solvents other than those described above, and examples thereof may include ethylene glycol dibutyl ether (11.3), diethylene glycol dibutyl ether (14.3), triethylene glycol dibutyl ether (15.9), 1,2-diethoxyethane (18.43), ethylene glycol monobutyl ether acetate (26.57), diethylene glycol monobutyl ether acetate (26.57), etc.

The ink of the invention can provide an increased density both at the center of each pixel and gaps between the pixels, and therefore can preferably be used for printing at a relatively low resolution, i.e., printing with a distance between the pixels in the range from 84 µm to 169 µm, more specifically, at a low resolution of 300 dpi×300 dpi or less or more preferably a low resolution in the range from 150×150 dpi to 225×225 dpi.

The pigment used in the ink of the invention may be any of conventional inorganic and organic pigments, as long as the pigment has a DBP oil absorption in the above-described range. Preferred examples of the pigment may include CARBON BLACK MA11, MA220 and MA600a available from Mitsubishi Chemical Corporation. Preferred examples of the pigment other than the black pigment may include SYMULER BRILLIANT CARMINE 6B, SYMULER RED, FASTOGEN SUPER MAGENTA, SYMULER FAST YELLOW, FASTOGEN BLUE 4RO-2, FASTOGEN GREEN, FASTOGEN SUPER VIOLET, etc., available from DIC Corporation.

It may be preferable to add a pigment dispersant to improve dispersibility of the pigment in the ink. The pigment dispersant usable in the invention is not particularly limited as long as the pigment can be stably dispersed in the solvent. Preferred examples of the pigment may include SOLSPERSE 11200, SOLSPERSE 21000, V216, etc., available from The Lubrizol Corporation. These pigments may be used singly or in an appropriate combination.

The dye usable in the ink of the invention may be any of conventional dyes. Preferred examples of the dye may include VALIFAST BLACK 3810, ELIXA BLACK 846, OIL BLACK HBB, OIL BLACK No.5, etc., available from Orient Chemical Industries Co., Ltd. Preferred examples of the dye other than the black dye may include OIL BLUE 2N, ELIXA ORANGE-240, VALIFAST BLUE 1603, ELIXA GREEN-502, VALIFAST ORANGE 1201, OIL GREEN 530, ELIXA GREEN-540, OIL YELLOW GG-S, ELIXA YELLOW-129, VALIFAST YELLOW 1101, etc. These dyes may be used singly or in an appropriate combination.

Besides the above-described components, the ink of the invention may include conventional additives. Examples of the additives may include a surfactant, such as an anionic, cationic, amphoteric or nonionic surfactant, an antioxidant, such as dibutylhydroxytoluene, propyl gallate, tocopherol, butylhydroxyanisol or nordihydroguaiaretic acid, etc.

The ink of the invention can be prepared, for example, by putting all the components at once or in fractions in a known dispersing device, such as a bead mill, to disperse the components, and filtering them with a known filtering device, such as a membrane filter, as desired.

Now, the non-aqueous inkjet ink of the invention is described in more detail based on Examples.

EXAMPLES

Preparation of Ink

Ink samples of Examples and Comparative Examples were prepared by mixing materials according to each composition shown in Tables 1 and 2 below (the numerical values shown in Tables 1 and 2 are in parts by mass), stirring the mixture with a bead mill for a residence time of about 20 minutes, and filtering the mixture with a membrane filter having a pore size of 3 µm.

Evaluation

<150 dpi×150 dpi Solid Color OD Density>

Using each of the ink samples of Examples and Comparative Examples, a solid color image was printed on RISO PAPER THIN TYPE, available from Riso Kagaku Corporation, with a CB2 head, available from Toshiba Tec Corporation, under the condition of 150 dpi×150 dpi (60 pl per dot), and was left for 24 hours in an environment of 23° C. and 50% RH. Then, OD values at front and back sides of the paper were measured using an optical densitometer (RD918, available from Macbeth). Based on the measured OD values, the solid color image and the strike-through were evaluated according to the following criteria.

Surface Density Evaluation Criteria:
A: OD value is 0.72 or more,
B: OD value is 0.70 or more and less than 0.72,
C: OD value is 0.68 or more and less than 0.70, and
D: OD value is less than 0.68.

Strike-Through Evaluation Criteria:
A: OD value is less than 0.25,
B: OD value is 0.25 or more and less than 0.3,
C: OD value is 0.3 or more and less than 0.35, and
D: OD value is 0.35 or more.

A formulation and results of evaluation of each ink sample are shown in Tables 1 and 2.

TABLE 1

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Pigment | MA77 | DBP oil absorption: 68 | 6.0 | | | | | 6.0 | | | | |
| | #44 | DBP oil absorption: 78 | | 6.0 | | | | | | | | |
| | MA100 | DBP oil absorption: 100 | | | 6.0 | | | | 6.0 | 7.0 | 5.0 | 4.0 |
| | #40 | DBP oil absorption: 110 | | | | 6.0 | | | | | | |
| | MA600 | DBP oil absorption: 131 | | | | | 6.0 | | | | | |
| Dye | VARIFAST BLACK 3810 | | 4.0 | 4.0 | 4.0 | 4.0 | 4.0 | 4.0 | 4.0 | 3.0 | 4.7 | 5.3 |
| Dispersant | SOLSPERSE 11200 (nv 50%) | | 5.0 | 5.0 | 5.0 | 5.0 | 5.0 | 5.0 | 5.0 | 4.2 | 3.0 | 2.4 |
| Solvent | Hexyl laurate | α value = 10 | 30.0 | 30.0 | 30.0 | 30.0 | 30.0 | 30.0 | 30.0 | 35.0 | 25.0 | 20.0 |
| | Diethylene glycol monohexyl ether | α value = 44 | 35.0 | 35.0 | 35.0 | 35.0 | 35.0 | 55.0 | 55.0 | 30.8 | 42.3 | 48.3 |
| | Isooctyl palmitate | α value = 7 | | | | | | | | | | |
| | Petroleum solvent (AF7) | α value = 0 | 20.0 | 20.0 | 20.0 | 20.0 | 20.0 | | | 20.0 | 20.0 | 20.0 |
| | Total | | 100.0 | 100.0 | 100.0 | 100.0 | 100.0 | 100.0 | 100.0 | 100.0 | 100.0 | 100.0 |
| Evaluation | 150 dpi * 150 dpi OD value | | 0.72 | 0.71 | 0.71 | 0.71 | 0.71 | 0.70 | 0.68 | 0.69 | 0.70 | 0.70 |
| | Evaluation of solid color image | | A | B | B | B | B | B | C | C | B | B |
| | 150 dpi * 150 dpi back side OD value | | 0.29 | 0.28 | 0.29 | 0.29 | 0.30 | 0.31 | 0.30 | 0.21 | 0.29 | 0.31 |
| | Evaluation of strike-through | | B | B | B | B | C | C | C | A | B | C |

TABLE 2

| | | | Comparative Example 1 | Comparative Example 2 | Comparative Example 3 | Comparative Example 4 | Comparative Example 5 | Comparative Example 6 |
|---|---|---|---|---|---|---|---|---|
| Pigment | MA77 | DBP oil absorption: 68 | 10.0 | | | | | |
| | #44 | DBP oil absorption: 78 | | 10.0 | | | | |
| | MA100 | DBP oil absorption: 100 | | | 10.0 | | | |
| | #40 | DBP oil absorption: 110 | | | | 10.0 | | |
| | MA600 | DBP oil absorption: 131 | | | | | 10.0 | |
| Dye | VARIFAST BLACK 3810 | | | | | | | 7.0 |
| Dispersant | SOLSPERSE 11200 (nv50%) | | 7.5 | 7.5 | 7.5 | 7.5 | 7.5 | |
| Solvent | Hexyl laurate | α value = 10 | 50.0 | 50.0 | 50.0 | 50.0 | 50.0 | |
| | Diethylene glycol monohexyl ether | α value = 44 | | | | | | 73.0 |
| | Isooctyl palmitate | α value = 7 | 22.5 | 22.5 | 22.5 | 22.5 | 22.5 | |
| | Petroleum solvent (AF7) | α value = 0 | 10.0 | 10.0 | 10.0 | 10.0 | 10.0 | 20.0 |
| | Total | | 100.0 | 100.0 | 100.0 | 100.0 | 100.0 | 100.0 |
| Evaluation | 150 dpi * 150 dpi OD value | | 0.67 | 0.66 | 0.63 | 0.62 | 0.64 | 0.63 |
| | Evaluation of solid color image | | D | D | D | D | D | D |
| | 150 dpi * 150 dpi back side OD value | | 0.20 | 0.19 | 0.20 | 0.20 | 0.20 | 0.51 |
| | Evaluation of strike-through | | A | A | A | A | A | D |

As can be seen from Table 1, the ink of the invention provided a high image density even at the low resolution of 150 dpi×150 dpi (60 pl per dot) while reducing the strike-through. Comparing the Example and the Comparative Example using the same pigment, the front side OD value in Example 1, for example, was higher by 0.05 than that in Comparative Example 1, and the front side OD value in Example 5 was higher by 0.07 than that in Comparative Example 5.

Comparative Examples 1 to 5, where the colorant included only a pigment and no spread (blurring) of dots was expected, had a low image density at the low resolution. Comparative Example 6, where the colorant included only a dye, had markedly increased strike-through.

What is claimed is:

1. A non-aqueous inkjet ink, comprising:
   at least a pigment,
   a dye and organic solvents, wherein a total amount of the pigment and the dye is at least 3 mass % relative to a total amount of the ink,
   a content ratio of the pigment to the dye is in the range from 7:3 to 4:6, the pigment has a DBP oil absorption in the range from 60 cm³/100 g to 140 cm³/100 g, and the organic solvents include at least two organic solvents including an organic solvent with an α value of at most 10 and an organic solvent with an α value of at least 30.

2. An inkjet printing method comprising forming an image at a print resolution of 300 ×300 dpi or less using the non-aqueous inkjet ink as claimed in claim 1.

3. The non-aqueous inkjet ink of claim 1, wherein the organic solvent with an α value of at most 10 is selected from the group consisting of isooctyl palmitate, dibutyl ether, hexyl laurate, methyl palmitate, methyl oleate, butyl oleate; and
   wherein the organic solvent with an α value of at least 30 is selected from the group consisting of dioxane, diethylene glycol monohexyl ether, triethylene glycol monobutyl ether, tetrahydrofurfuryl alcohol, triethylene glycol monoethyl ether.

* * * * *